United States Patent [19]
Lundgren

[11] 4,206,841
[45] Jun. 10, 1980

[54] SCREW CONVEYOR CAPABLE OF MAINTAINING A RELATIVELY UNIFORM FLOW OF CONVEYED MATERIAL

[75] Inventor: Rolf B. Lundgren, Ornskoldsvik, Sweden

[73] Assignee: Mo och Domsjo Aktiebolag, Ornskoldsvik, Sweden

[21] Appl. No.: 918,896

[22] Filed: Jun. 26, 1978

Related U.S. Application Data

[63] Continuation-in-part of Ser. No. 906,491, May 16, 1978, abandoned.

[30] Foreign Application Priority Data

May 20, 1977 [SE] Sweden .................... 7705949

[51] Int. Cl.² ............................. B65G 33/00
[52] U.S. Cl. ............................. 198/670; 198/664; 198/676
[58] Field of Search ............. 198/664, 665, 670, 676, 198/548, 555, 677, 657

[56] References Cited
U.S. PATENT DOCUMENTS

| 611,383 | 9/1898 | Landis | 198/664 X |
|---|---|---|---|
| 3,464,539 | 9/1969 | Kelly | 198/676 X |

*Primary Examiner*—Robert B. Reeves
*Assistant Examiner*—Douglas D. Watts

[57] ABSTRACT

A screw conveyor is provided capable of maintaining a relatively uniform flow of conveyed material, even when operating well below its flow capacity, having a helical screw with a plurality of helical blade segments at one end, each segment extending over an arc of from about 100° to about 130° about the central stem of the screw, and having a pitch length within the range from about 0.5 to about 3 times the pitch length of the helical screw; the pitch length of the helical screw being from about 0.5 to about 1 times its diameter; the segments being spaced apart a distance within the range from about 0 to about 22 mm; the plurality of segments taken collectively defining a plurality of through passages extending axially along the central stem of the screw, and extending in uniformly spaced relationship ±10° circumferentially about the 360° circumference of the passage; each segment having a base portion attached at its inner periphery to the central stem of the screw over an arc of from about 50° to about 60°, and a wing portion extending about and closely abutting the inside wall of the passage, and terminating in a tip abutting the inside passage wall, the wing portion defining an open space between its inner periphery and the central stem of the screw, the space forming a part of a through passage defined by the segments.

18 Claims, 2 Drawing Figures

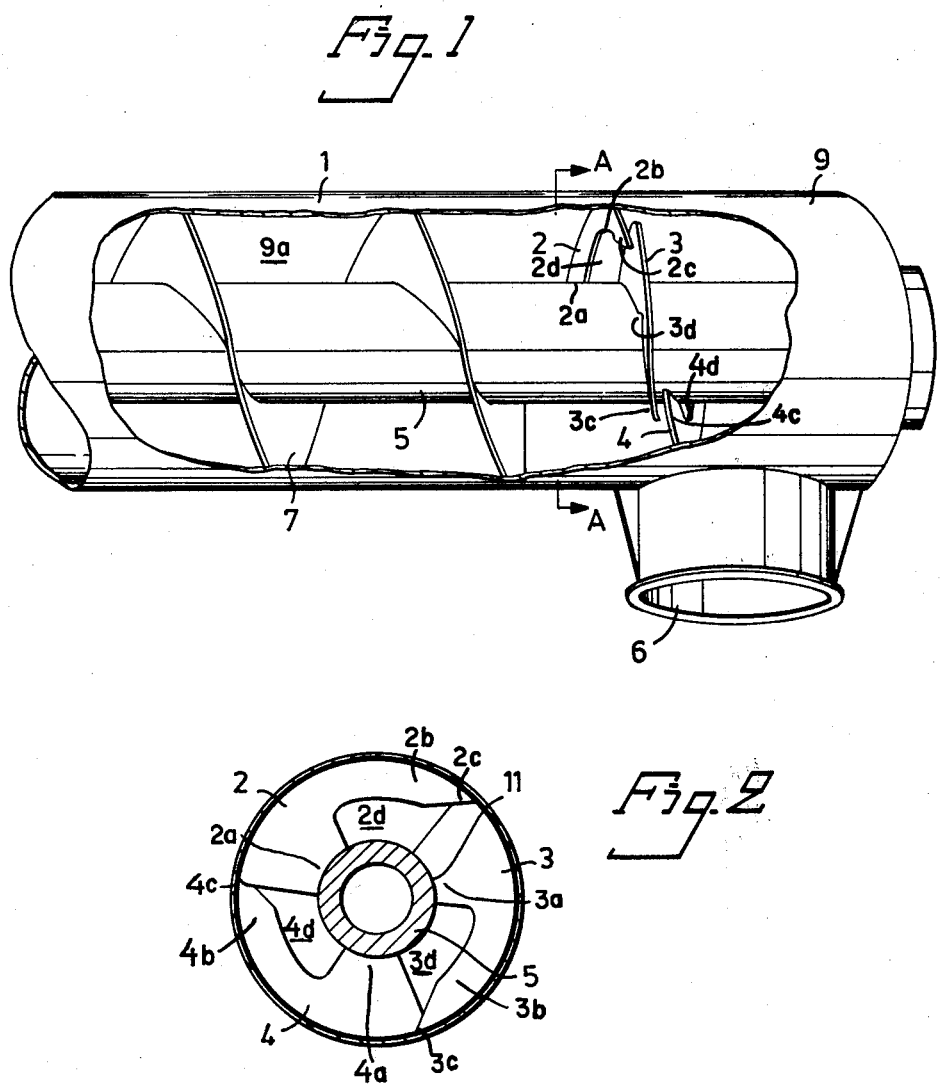

SCREW CONVEYOR CAPABLE OF MAINTAINING A RELATIVELY UNIFORM FLOW OF CONVEYED MATERIAL

This application is a continuation-in-part of Ser. No. 906,491, filed May 16, 1978, now abandoned.

Screw conveyors are frequently employed for conveying free-flowing particulate solid material such as wood chips, finely-divided lignocellulosic material, dried and shredded cellulose pulp, disintegrated bark, chemicals, sand and cereals. However, the uniformity of the flow of material delivered by the conveyor is frequently unsatisfactory. A nonuniform delivery can impede flow-dependent operations beyond the conveyor, for example, in the feeding of wood chips to a disc refiner. Irregularities in the flow of raw material to the refiner results in an uneven load on the refiner, which impairs the efficiency and effectiveness of the refining operation. The same is true of many other types of conveyor-fed particulate material processing apparatus. Consequently, it is an important desideratum that a screw conveyor maintain a relatively uniform delivery flow under all conditions, whether the screw conveyor is operating at its capacity or well below its capacity.

Nonuniformity in the delivery flow of material conveyed by the screw results from the accumulation of material at the terminal end of the screw. The material is formed into aggregates, heaps or clumps, which are then delivered as such, intermittently. When the screw is operated at low rotational speeds, within the range for example of from 50 to 100 rpm, there are relatively long intervals between the discharge of these accumulated batches of material. Moreover, the material is frequently compacted in agglomerates at the discharge end, increasing the delivery intervals of the material; and further contributing to irregularities in flow.

Nonuniform flow is particularly frequent when the conveyor is operated well below its capacity. Thus, a screw conveyor operating at only 30% of capacity can give variations in flow ranging as high as ±70%, which increases the problems in processing apparatus downstream of the conveyor. In most cases, serious problems arise whenever the screw conveyor is operating at less than 50% of capacity. The result is that screw conveyors are much restricted in the range of uses to which they can be put.

In order to reduce the extent to which the conveyed material is compacted and agglomerated, a shaft has been provided that extends perpendicularly to the longitudinal axis of the screw conveyor, and carries an agitator blade at its end, to break up the agglomerates. However, while this device does break up the agglomerates, the flow remains nonuniform.

In accordance with the invention a screw conveyor is provided capable of maintaining a relatively uniform flow of conveyed material, even when operating well below its flow capacity, comprising, in combination, a housing; an elongated conveyor passage through the housing, having an inlet and an outlet at opposite ends thereof; a helical screw having a central stem and a helical blade extending outwardly therefrom, rotatably mounted in the passage, for conveying material along the passage from one end to the other with rotation of the screw; and a plurality of helical blade segments at one end of the screw, each segment extending over an arc of from about 100° to about 130° about the central stem of the screw, having a pitch length within the range from about 0.5 to about 3 times and preferably from about 0.6 to about 1.8 times the pitch length of the helical screw the helical screw having a pitch length from about 0.5 to about 1 times its diameter; the segments being spaced apart a distance within the range from about 0 to about 22 mm; the plurality of segments taken collectively defining a plurality of through passages extending axially along the central stem of the screw and extending in uniformly spaced relationship ±10° circumferentially about the 360° circumference of the passage, each segment having a base portion attached at its inner periphery to the central stem of the screw over an arc of from about 50° to about 60°, and a wing portion extending about and closely abutting the inside wall of the passage, and terminating in a tip abutting the inside passage wall, the wing portion defining an open space between its inner periphery and the central stem of the screw, the space forming a part of a through passage defined by the segments.

The screw conveyor can be of conventional design. The plurality of helical blade segments can be provided at the outlet end, or at both outlet ends, if the screw can be operated in either direction of rotation. The helical blade segments should be arranged at or immediately upstream of or adjacent the outlet opening from the conveyor passage.

At least two helical blade segments are employed. The number required depends upon the diameter or circumference of the screw. From two to four helical blade segments will suffice for screw conveyors in which the screw has a diameter of up to about 45 cm. At diameters in excess of 45 cm, extending up to about 80 cm, from three to five blade segments are desirable. At diameters in excess of 80 cm, up to about 150 cm, from four to six blade segments can be used.

The segments are arranged about the 360° circumference of the screw in a relatively uniformly spaced relationship, either at identical spacing or at a spacing varying ±10° from the identical spacing. They each extend over an arc of from about 100° to about 130°.

The spacing between the blade segments of the array can be within the range from about 0 to about 22 mm, each segment being substantially parallel to the next-preceding and/or next-succeeding segment in the array. The spacing is to some extent dependent upon the number of segments. The following Table summarizes the spacing ranges for from two to six segments:

TABLE I

| Number of segments | Location of Spacing between segments (proceeding in feed direction) | Spacing between segments (mm) |
|---|---|---|
| 2 |  | 0 to 22 |
| 3 | 1 and 2 | 12 to 22 |
|  | 2 and 3 | 10 to 20 |
| 4 | 1 and 2 | 12 to 22 |
|  | 2 and 3 | 0 to 10 |
|  | 3 and 4 | 10 to 20 |
| 5 | 1 and 2 | 12 to 22 |
|  | 2 and 3 | 0 to 13 |
|  | 3 and 4 | 5 to 17 |
|  | 4 and 5 | 10 to 20 |
| 6 | 1 and 2 | 12 to 22 |
|  | 2 and 3 | 0 to 13 |
|  | 3 and 4 | 3 to 15 |
|  | 4 and 5 | 6 to 18 |

TABLE I-continued

| Number of segments | Location of Spacing between segments (proceeding in feed direction) | Spacing between segments (mm) |
|---|---|---|
| | 5 and 6 | 10 to 20 |

Each segment has a base portion attached at its inner periphery to the central stem of the screw over an arc of from about 50° to about 60°, and a wing portion extending about and closely abutting the inside wall of the passage, and terminating in a tip abutting the inside passage wall. The wing portion extends over an arc of from about 70° to about 100°, and defines an open space between its inner periphery and the central stem of the screw. The spaces defined by the wing members of the plurality of segments taken collectively define a plurality of through passages corresponding in number to the number of segments, between the central stem of the screw and the inner periphery of the wing members.

The open space defined between the inner periphery of each wing portion and the central stem of the screw is within the range from about 0.1 to about 0.8, preferably 0.5 times the distance between the screw shaft and the outer periphery of the wing portion.

Each wing portion terminates in a tip abutting the inside wall of the passage. The tip is sharp, and defines an angle of 90° or less to the inside wall of the passage. The tip portion is arranged to face the direction of rotation of the screw, so that the tip portion is the last portion of the segment to encounter material proceeding along the passage conveyed by the screw.

In effect, the array of blade segments constitutes a section of the helical blade of the screw, which has been cut through and offset along the central stem of the screw, with the addition of through openings through the blade. This interferes with the conveying of material along the screw, slowing it down, and thus results in a more uniform flow, partly because some material conveyed along the screw is left behind when the screw is operating at below its capacity, filling in a gap in the conveyance of material. Moreover, the formation of aggregates or agglomerates of conveyed material is also reduced, since the segments break these up.

The blade segments can be attached to the stem of the screw conveyor by any means, such as welding, soldering, or brazing, and they can also be made integral with the stem. Metals and plastics can be used.

The following tabulation represents some Examples of arrays of blade segments which can be used.

TABLE II

| Number of Segments | Screw Diameter (cm) | Spacing between segments (mm) | Pitch length (mm) | Arc length (°) |
|---|---|---|---|---|
| 2 | 25 | 18 | 17 | 100 to 130° |
| 3 | 45 | 18, 15 | 31 | 100 to 120° |
| 4 | 50 | 18, 3, 15 | 35 | 100 to 130° |
| 5 | 85 | 18, 5, 10, 15 | 59 | 100 to 130° |
| 6 | 100 | 18, 4, 8, 12, 15 | 70 | 100 to 130° |

A preferred embodiment of the invention is illustrated in the drawings, in which:

FIG. 1 represents a longitudinal view of a screw conveyor and housing at the outlet end, with parts broken away to show the appearance of the screw within the conveyor passage and including an array of blade segments in accordance with the invention; and FIG. 2 is a cross-sectional view of the screw conveyor shown in FIG. 1, taken along the line A—A.

In the screw conveyor shown in FIG. 1, the housing 9 is provided with an elongated conveyor passage 9a extending from end to end of the housing, and provided with an inlet (not shown) and an outlet 6. Extending axially along the passage and closely abutting the inside wall 9b of the passage is a helical central screw having a stem 5 to which is attached the helical screw blade 7. The screw has a diameter of approximately 68 cm, and the stem a diameter of 27 cm. The screw is rotatably mounted and motor driven (not shown, but of conventional design and no part of the invention).

At the outlet end 6 of the screw is an array of three blade segments 2,3,4 in accordance with the invention, extending about the screw in uniformly spaced relationship over the entire 360° circumference thereof.

Each blade segment 2,3,4 as best seen in FIG. 2 has a base portion 2a, 3a, 4a attached to the screw stem 5, and a wing portion 2b, 3b, 4b, integral with the base portion and extending about and closely abutting the inside wall 9b of the passage 9a. Each wing portion terminates in a sharp tip 2c, 3c, 4c overlapping the base portion of the next-adjacent blade segment, and also closely abutting the inside wall of the passage. Between each wing portion 2b, 3b, 4b, the base portion 2a, 3a, 4a, and the stem 5 of the screw is defined an open space 2d, 3d, 4d, in effect constituting three passages between the inner periphery of the wing portion and the stem 5.

The blade segment 2 is spaced 18 mm from the next blade segment 3, and segment 3 is spaced 15 mm from the next segment 4. The pitch length of each segment is 30°, and each segment extends over an arc of 130° about the stem 5.

In operation, it will be apparent that as the screw 1 rotates, material is conveyed along the passage 9a of the housing 9. When this material reaches the blade segment array 2,3,4 of the invention, the material will be divided into a number of portions equal to the number of blade segments, in this case three, owing with the fact that the three tips and wing portions of the segments have displaced axial positions along the screw, and this assists in maintaining a uniform flow.

For example, in tests carried out with this screw conveyor, but without the segments, commercially available wood chips were fed through with the conveyor filled to 30% of its flow capacity. The flow was measured continuously over a period of time to note variations in flow, and these variations were found to be ±70%.

When the same screw conveyor was provided with the array of blade segments, in accordance with the invention, as shown in the Figures, the outflow for the conveyor was found to be extremely uniform, within the range of ±15% to 20%.

A further test carried out with commercially available wood chips using a similar screw conveyor having a screw of a diameter of approximately 65 cm, with four blade segments spaced at distances of 16 mm between the third and fourth, 4 mm between the second and third, and 18 mm between the first and second, with the wing tip on the fourth blade segment 100 mm from the leading edge of the discharge outlet. The hole of this fourth segment was thus located over the discharge outlet.

This screw conveyor was tested with and without the blade segment array in accordance with the invention. In the first test the flow variations during operation at 30% of flow capacity varied ±70%. With the blade segment array in accordance with the invention, also operating at a 30% flow capacity, the flow was extremely uniform, with variations only within the range from ±15 to 20%.

The positioning of the blade segments and the number of blade segments used will depend upon the particle size and type of material being conveyed, larger size particles requiring a larger spacing between the blade segments.

The flow conveyors in accordance with the invention are useful for conveying all types of particulate solid materials, such as cellulose pulp, wood chips, chemicals, sand, cereals and similar materials.

Having regard to the foregoing disclosure the following is claimed as the inventive and patentable embodiments thereof:

1. A screw conveyor capable of maintaining a relatively uniform flow of conveyed material even when operating at well below its flow capacity, comprising, in combination, a housing; an elongated conveyor passage through the housing, having an inlet and an outlet at opposite ends thereof; a helical screw having a central stem and a helical blade extending outwardly therefrom, rotatably mounted in the passage, for conveying material along the passage from one end to the other with rotation of the screw; and a plurality of helical blade segments at one end of the screw, each segment extending over an arc of from about 100° to about 130° about the central stem of the screw, having a pitch length within the range from about 0.5 to about 3 times the pitch length of the helical screw, the helical screw having a pitch length from about 0.5 to about 1 times its diameter; the segments being spaced apart a distance not exceeding about 22 mm; the plurality of segments taken collectively defining a plurality of through passages extending axially along the central stem of the screw and extending in relatively uniformly spaced relationship circumferentially about the 360° circumference of the passage, each segment having a base portion attached at its inner periphery to the central stem of the screw over an arc of from about 50° to about 60°, and a wing portion extending about and abutting the inside wall of the passage, and terminating in a tip whose outside edge is abutting the inside passage wall and whose inside edge extends along a chord line intersecting the inside wall of the passage, the wing portion defining an open space between its inner periphery and the central stem of the screw, the space forming a part of a through passage defined by the segments.

2. A screw conveyor in accordance with claim 1 in which the number of blade segments is from two to six.

3. A screw conveyor in accordance with claim 2 having two segments in which the spacing between the segments does not exceed 22 mm.

4. A screw conveyor according to claim 2 having from three to four blade segments.

5. A screw conveyor according to claim 1 in which the last of the blade segments is disposed directly across the outlet opening.

6. A screw conveyor in accordance with claim 1 in which the pitch length is from about 0.6 to about 1.8 times the pitch length of the helical screw.

7. A screw conveyor in accordance with claim 1 having from two to four helical blade segments and a screw diameter of up to 45 cm.

8. A screw conveyor in accordance with claim 1 having from three to five helical blade segments and a screw diameter of up to 80 cm.

9. A screw conveyor in accordance with claim 1 having from four to six helical blade segments and a screw diameter of up to 150 cm.

10. A screw conveyor in accordance with claim 1 in which the open space defined between the inner periphery of each wing portion and the central stem of the screw is within the range from about 0.1 to about 0.8 times the distance between the screw shaft and the outer periphery of the wing portion.

11. A screw conveyor in accordance with claim 1 in which the tip defines an angle of not over 90° to the inside wall of the passage.

12. A screw conveyor in accordance with claim 1 in which the arc length of the wing portion of the helical blade segments is from about 70° to about 100°.

13. A screw conveyor in accordance with claim 1 in which there are at least three helical blade segments, and the segments extend in overlapping relationship circumferentially about the 360° circumference of the passage.

14. A screw conveyor in accordance with claim 1 in which the circumferential spacing of the helical blade segments about the 360° circumference of the passage is uniform ±10°.

15. A screw conveyor in accordance with claim 2 having three segments, in which the spacing between the first and second segments is within the range from about 12 to about 22 mm, and the spacing between the second and third segments is within the range from about 10 to about 20 mm.

16. A screw conveyor in accordance with claim 2 having four segments, in which the spacing between the first and second segments is within the range from 12 to 22 mm, the spacing between the second and third segments does not exceed 10 mm, and the spacing between the third and fourth segments is within the range from 10 to 20 mm.

17. A screw conveyor in accordance with claim 2 having five segments, in which the spacing between the first and second segments is within the range from 12 to 22 mm, the spacing between the second and third segments does not exceed 13 mm, the spacing between the third and fourth segments is within the range from 5 to 17 mm, and the spacing between the fourth and fifth segments is within the range from 10 to 20 mm.

18. A screw conveyor in accordance with claim 2 having six segments, in which the spacing between the first and second segments is within the range from 12 to 22 mm, the spacing between the second and third segments does not exceed 13 mm, the spacing between the third and fourth segments is within the range from 3 to 15 mm, the spacing between the fourth and fifth segments is within the range from 6 to 18 mm, and the spacing between the fifth and sixth segments is within the range from 10 to 20 mm.

* * * * *